(12) United States Patent
Ohtsuka

(10) Patent No.: US 7,432,520 B2
(45) Date of Patent: Oct. 7, 2008

(54) CASSETTE PROCESSING APPARATUS

(75) Inventor: Yuzuru Ohtsuka, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 218 days.

(21) Appl. No.: 11/513,044

(22) Filed: Aug. 31, 2006

(65) Prior Publication Data
US 2007/0045577 A1 Mar. 1, 2007

(30) Foreign Application Priority Data
Aug. 31, 2005 (JP) ............... 2005-251775

(51) Int. Cl.
*G03B 42/08* (2006.01)
(52) U.S. Cl. .................... 250/589
(58) Field of Classification Search .......... 250/580–589
See application file for complete search history.

(56) References Cited
U.S. PATENT DOCUMENTS 5,326,983 A * 7/1994 Hejazi ................ 250/589
5,493,128 A * 2/1996 Boutet ................ 250/584
2006/0131527 A1* 6/2006 Wendlandt et al. ......... 250/589

FOREIGN PATENT DOCUMENTS

JP 7-25418 A 1/1995

* cited by examiner

Primary Examiner—David P. Porta
Assistant Examiner—Djura Malevic
(74) Attorney, Agent, or Firm—Sughrue Mion, PLLC

(57) ABSTRACT

A cassette processing apparatus has a plurality of stack units for holding respective cassettes in an array, and a tilting mechanism for tilting the cassettes held by the respective stack units at respective different angles depending on the types of the cassettes. The tilting mechanism has a rotatable shaft connected to a rotary actuator, and a plurality of eccentric cams held in respective angular positions by the rotatable shaft to adjust the angles at which the stack units are tilted thereby to set angles at which the cassettes are titled.

7 Claims, 8 Drawing Sheets

CASSETTE PROCESSING APPARATUS

BACKGROUND OF THE INVENTION

1. Field of the Invention

The present invention relates to a cassette processing apparatus for use with at least one of a cassette loader for loading a cassette housing a recording medium capable of storing radiation image information and a cassette unloader for unloading such a cassette.

2. Description of the Related Art

Heretofore, there have been known a radiation image information reading apparatus employing a stimulable phosphor panel that stores part of radiation energy applied thereto and emits the stored radiation energy in response to stimulating light such as visible light applied thereto.

Usually, after the radiation image information of a subject is stored in a stimulable phosphor panel that is housed in a cassette, the cassette is loaded into a radiation image information reading apparatus. In the radiation image information reading apparatus, the stimulable phosphor panel is taken out of the cassette, and the radiation image information stored in the stimulable phosphor panel is read. If necessary, remaining radiation image information is erased from the stimulable phosphor panel. Thereafter, the stimulable phosphor panel is brought back into the cassette and unloaded from the radiation image information reading apparatus for storing the radiation image information of another subject.

It has been desired to successively process a number of cassettes for efficiently reading stored radiation image information from stimulable phosphor panels housed in the cassettes. For successively processing a number of cassettes, there has been known an automatic storage phosphor cassette loader as disclosed in Japanese Laid-Open Patent Publication No. 7-25418, for example.

As shown in FIG. 8 of the accompanying drawings, the disclosed automatic storage phosphor cassette loader, generally designated by 1, has a main housing 2 including a portal 4 that can be opened and closed by a door 3. When the portal 4 is opened by the door 3, it provides access into the main housing 2. The portal 4 has a pair of vertical conveyors 5a, 5b horizontally spaced a constant interval from each other. The conveyors 5a, 5b comprise respective endless belts 6a, 6b having respective arrays of spaced ledges 7a, 7b.

The main housing 2 has a loading cassette site 8a, a reading cassette site 8b, and an unloading cassette site 8c which are arranged in a vertical array on the conveyors 5a, 5b.

The automatic storage phosphor cassette loader 1 operates as follows: The operator opens the door 3, places a storage phosphor cassette 9 in the loading cassette site 8a, and then closes the door 3. Then, when the conveyors 5a, 5b are actuated, the storage phosphor cassette 9 is fed downwardly into the reading cassette site 8b. In the reading cassette site 8b, a reader, not shown, removes the storage phosphor from the storage phosphor cassette 9, and reads stored radiation image information from the storage phosphor.

Thereafter, the storage phosphor is returned into the storage phosphor cassette 9, which is then fed into the unloading cassette site 8c by the conveyors 5a, 5b. After the conveyors 5a, 5b are stopped, the storage phosphor cassette 9 is taken out of the unloading cassette site 8c.

In the conventional automatic storage phosphor cassette loader 1, adjacent ones of the ledges 7a, 7b for placing the storage phosphor cassette 9 thereon are spaced a constant interval from each other. If a storage phosphor cassette 9 of smaller dimensions, for example, is to be placed on the conveyors 5a, 5b, then adapters or pallets designed to handle such a smaller cassette have to be used on the conveyors 5a, 5b. Consequently, when a wide variety of storage phosphor cassettes 9 of different dimensions are to be used in the conventional automatic storage phosphor cassette loader 1, it is considerably troublesome to handle those storage phosphor cassettes 9.

SUMMARY OF THE INVENTION

It is an object of the present invention to provide a cassette processing device for allowing cassettes of different types to be handled easily and reliably for increased efficiency.

According to the present invention, there is provide a cassette processing apparatus for use with at least one of a cassette loader for loading a cassette housing a recording medium capable of storing radiation image information and a cassette unloader for unloading the cassette. The cassette processing apparatus includes a plurality of stack units for holding respective cassettes in an array, and a tilting mechanism for tilting the cassettes held by the respective stack units at respective different angles depending on the types of the cassettes.

Preferably, the cassette processing apparatus should further include a detecting mechanism for detecting the types of the cassettes, and a control mechanism for controlling the tilting mechanism based on the types of the cassettes detected information by the detecting mechanism.

Each of the types of the cassettes should preferably include at least a dimension of the cassette or the sensitivity of the recording medium.

According to the present invention, since the cassettes are tilted at respective different angles depending on the types of the cassettes, the cassettes of the different types are arranged such that corners thereof for being gripped by the operator are held in respective different angular positions. Therefore, even when a cassette of a small size is disposed between cassettes of a large size, the corner of the cassette of the small size may project from ends of the cassettes of the large size.

The operator can easily and reliably remove the cassette of the small size from between the cassettes of the large size by gripping the corner of the cassette of the small size. In addition, the operator can easily insert the cassette of the small size between the cassettes of the large size. Consequently, the cassette processing apparatus allows the operator to handle cassettes of different types with increased efficiency.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
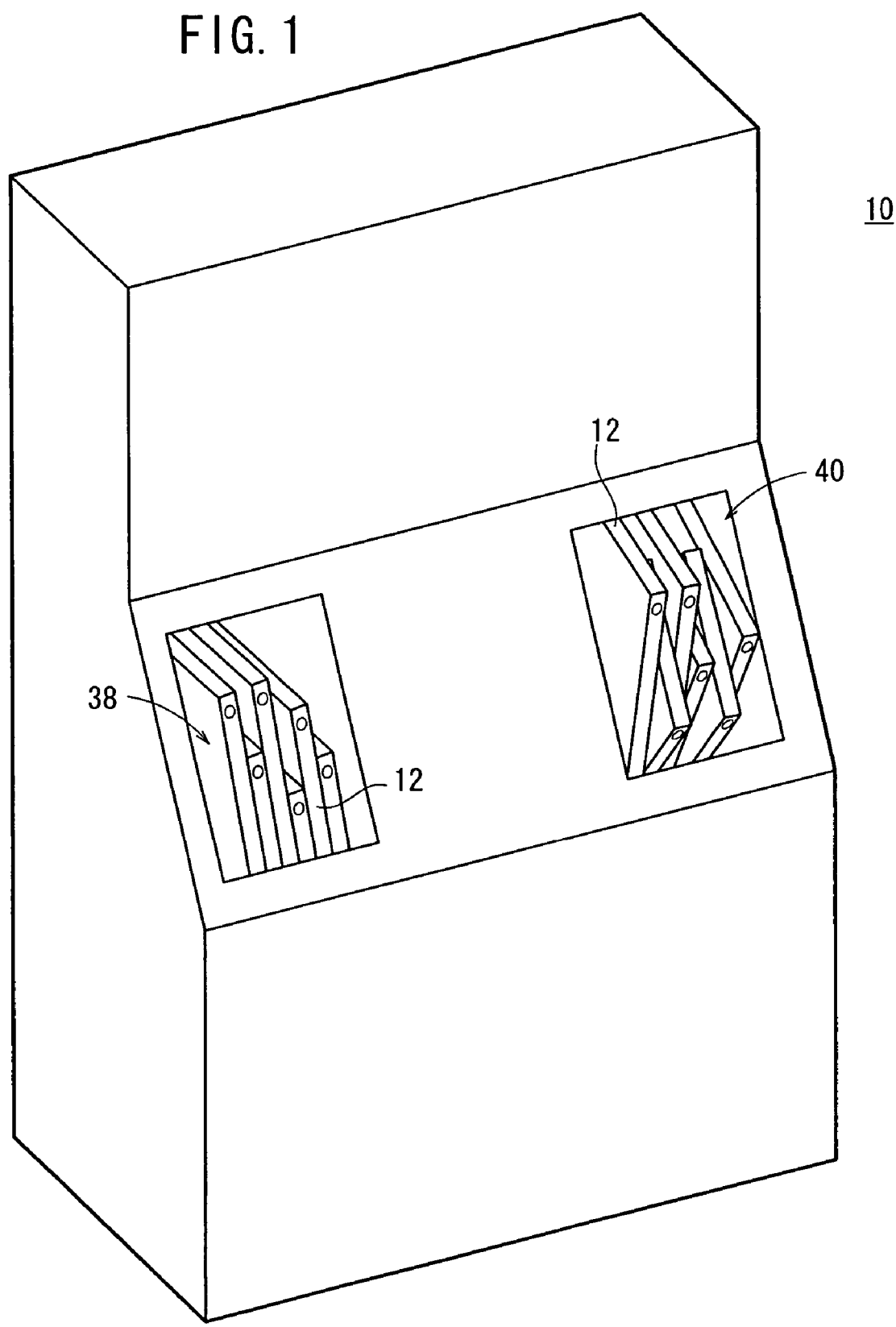
FIG. 1 is a perspective view of a radiation image information reading apparatus incorporating a cassette processing apparatus according to a first embodiment of the present invention.
Figure 2:
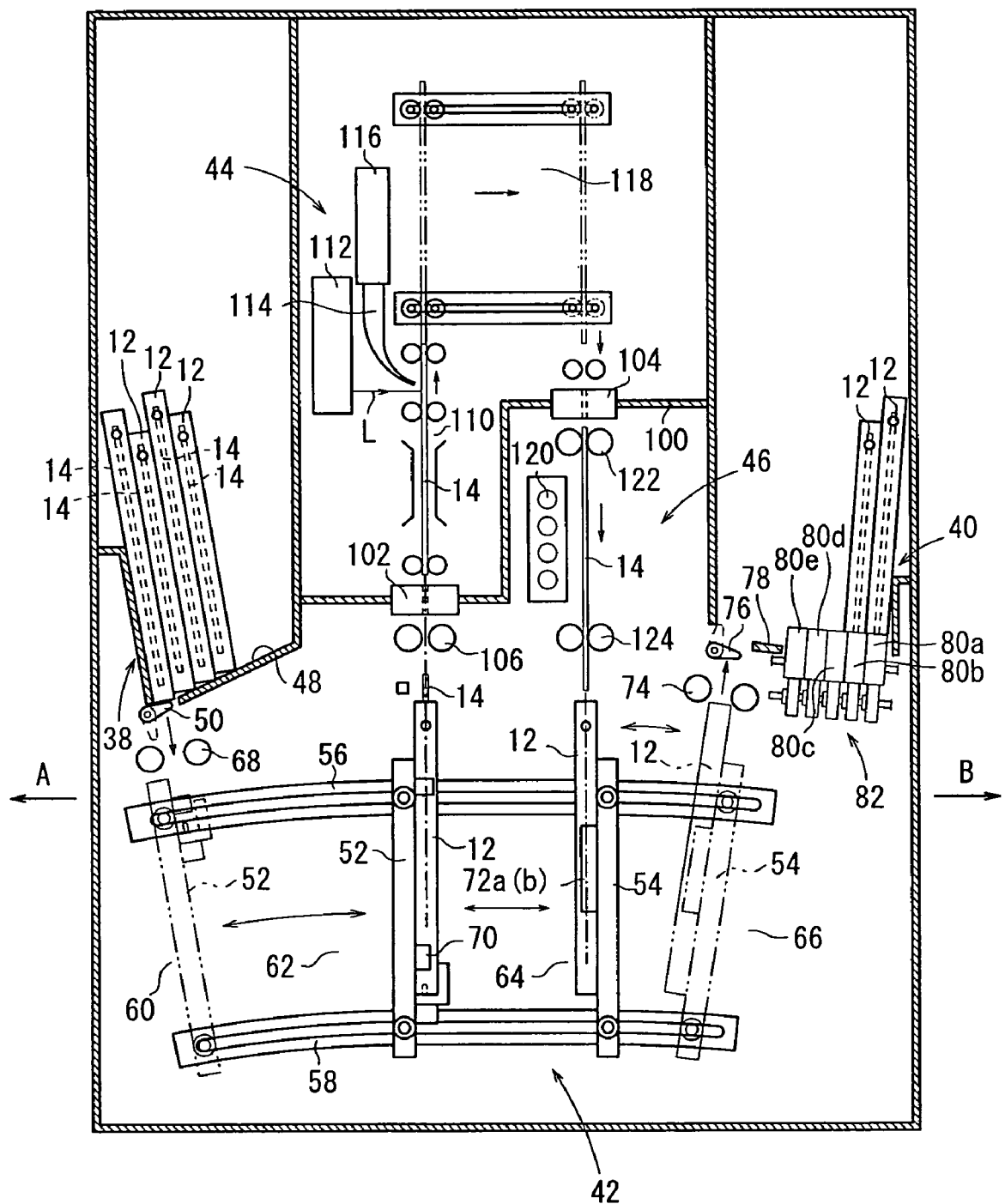
FIG. 2 is a vertical cross-sectional view showing internal structural details of the radiation image information reading apparatus shown in FIG. 1.

FIG. 1 shows in perspective a radiation image information reading apparatus 10 incorporating a cassette processing apparatus according to a first embodiment of the present invention, and FIG. 2 shows in vertical cross section internal structural details of the radiation image information reading apparatus 10.

When a cassette 12 is loaded into the radiation image information reading apparatus 10, the radiation image information reading apparatus 10 takes out a stimulable phosphor panel (recording medium) 14 from the cassette 12, reads radiation image information recorded in the stimulable phosphor panel 14, erases residual radiation image information from the stimulable phosphor panel 14, brings the stimulable phosphor panel 14 back into the cassette 12, and unloads the cassette 12.

Figure 3:
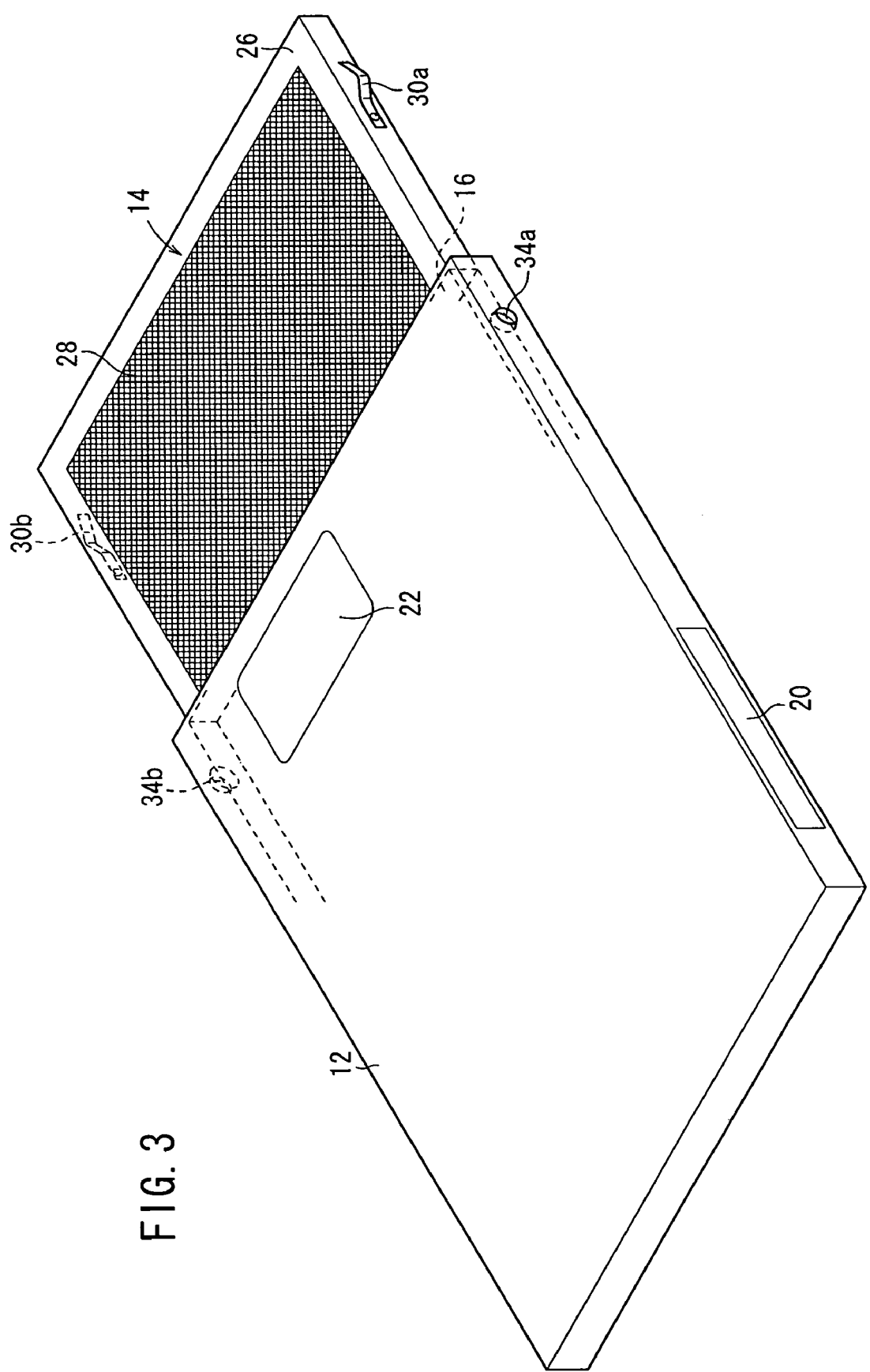
FIG. 3 is an enlarged perspective view of a cassette to be loaded into the radiation image information reading apparatus shown in FIG. 1.

As shown in FIG. 3, the cassette 12 has an opening 16 defined in an end thereof for inserting and removing the stimulable phosphor panel 14 therethrough. The cassette 12 also has identifiers 20, 22 disposed on a side surface thereof and a front surface thereof near the opening 16. Each of the identifiers 20, 22 comprises a bar code, an IC chip, or an RFID (Radio Frequency Identification) chip or the like which records the identification information (type) such as the size of the cassette 12 and the sensitivity of the stimulable phosphor panel 14.

The stimulable phosphor panel 14 housed in the cassette 12 may be in the form of a hard sheet comprising a support board 26 made of a hard material such as glass or the like and a columnar stimulable phosphor layer 28 evaporated on the support board 26. The stimulable phosphor layer 28 may be produced by evaporating a stimulable phosphor with heat in a vacuum container onto a support board 26 according to vacuum evaporation, sputtering, CVD, or ion plating.

The stimulable phosphor panel 14 may alternatively be in the form of a sheet having a flexible support board, and the cassette 12 may comprise a housing accommodating the sheet therein and a lid openably and closably mounted on an end of the housing.

Locking leaf springs 30a, 30b are mounted on respective opposite side edges of the stimulable phosphor panel 14 near an end thereof. When the stimulable phosphor panel 14 is inserted into the cassette 12, the locking leaf springs 30a, 30b engage with respective holes 34a, 34b defined in the cassette 12, securely retaining the stimulable phosphor panel 14 in the cassette 12. When unlocking pins, to be described later, are inserted into the respective holes 34a, 34b, the unlocking pins push the locking leaf springs 30a, 30b out of the respective holes 34a, 34b, unlocking the stimulable phosphor panel 14.

As shown in FIG. 2, the radiation image information reading apparatus 10 comprises a cassette loader 38 for loading a plurality of cassettes 12, a cassette unloader 40 for unloading a plurality of cassettes 12, a cassette feeder 42 for feeding a cassette 12 between the cassette loader 38 and the cassette unloader 40, a reading unit 44 for reading radiation image information from a stimulable phosphor panel 14 that has been taken out of a cassette 12, and an erasing unit 46 for erasing residual radiation image information from the stimulable phosphor panel 14 from which the desired radiation image information has been read by the reading unit 44.

The cassette loader 38 is capable of simultaneously loading a plurality of cassettes 12 of various different sizes therein. The cassette loader 38 has a bottom wall 48 slanted downwardly in a direction away from the cassette unloader 40, i.e., in the direction indicated by the arrow A. An openable and closable lid 50 is disposed in the lowermost portion of the bottom wall 48 for introducing a cassette 12 from the cassette loader 38 into the radiation image information reading apparatus 10.

The cassette feeder 42 has a first processing mechanism 52 and a second processing mechanism 54 for holding cassettes 12 supplied from the cassette loader 38. The first processing mechanism 52 is guided by a pair of upper and lower guide members 56, 58 for reciprocating movement from a first processing area 60 disposed below the cassette loader 38 through a second processing area 62 disposed below the reading unit 44 to a third processing area 64 disposed below the erasing unit 46. The second processing mechanism 54 is guided by the upper and lower guide members 56, 58 for reciprocating movement from the third processing area 64 to a fourth processing area 66 disposed below the cassette unloader 40.

In the first processing area 60, the first processing mechanism 52 supports the lower end of a cassette 12 that is supplied from the cassette loader 38 by nip rollers 68. The first processing mechanism 52 has an ejector pin (not shown) which is inserted into a hole (not shown) defined in the end of the cassette 12 for discharging the stimulable phosphor panel 14 from the cassette 12. The first processing mechanism 52 also has a detector 70 for reading the type of the cassette 12, such as size information, sensitivity information, etc., recorded in the identifier 20 on the cassette 12 supplied from the cassette loader 38. The identifier 20 and the detector 70 jointly serve as a detecting mechanism for detecting the type of the cassette 12.

The first processing mechanism 52 has unlocking pins (not shown) which are inserted into the respective holes 34a, 34b defined in the opposite sides of the cassette 12 for unlocking the stimulable phosphor panel 14 from the cassette 12.

The second processing mechanism 54 has a pair of vertically movable gripper plates 72a, 72b for gripping the opposite sides of a cassette 12 that has been fed to the third processing area 64 by the first processing mechanism 52.

The cassette unloader 40 accommodates therein a plurality of cassettes 12 that are discharged one by one from the fourth processing area 66 by nip rollers 74 and introduced through an openable and closable lid 76 into the cassette unloader 40. The cassette unloader 40 has a short bottom wall 78 slanted downwardly in a direction away from the cassette loader 38, i.e., in the direction indicated by the arrow B.

Figure 4:
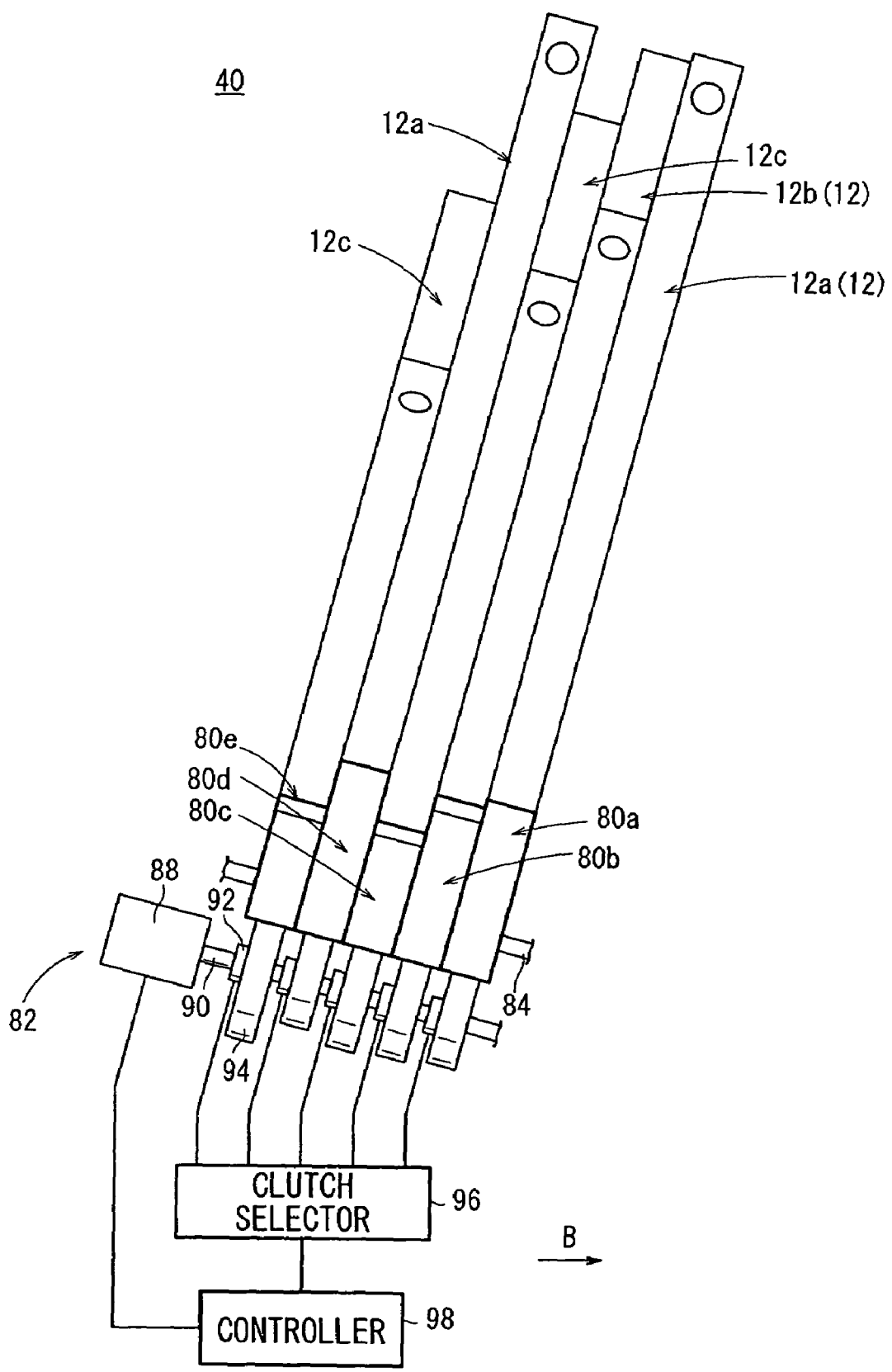
FIG. 4 is a front elevational view of stack units and a tilting mechanism of the radiation image information reading apparatus shown in FIG. 1.
Figure 5:
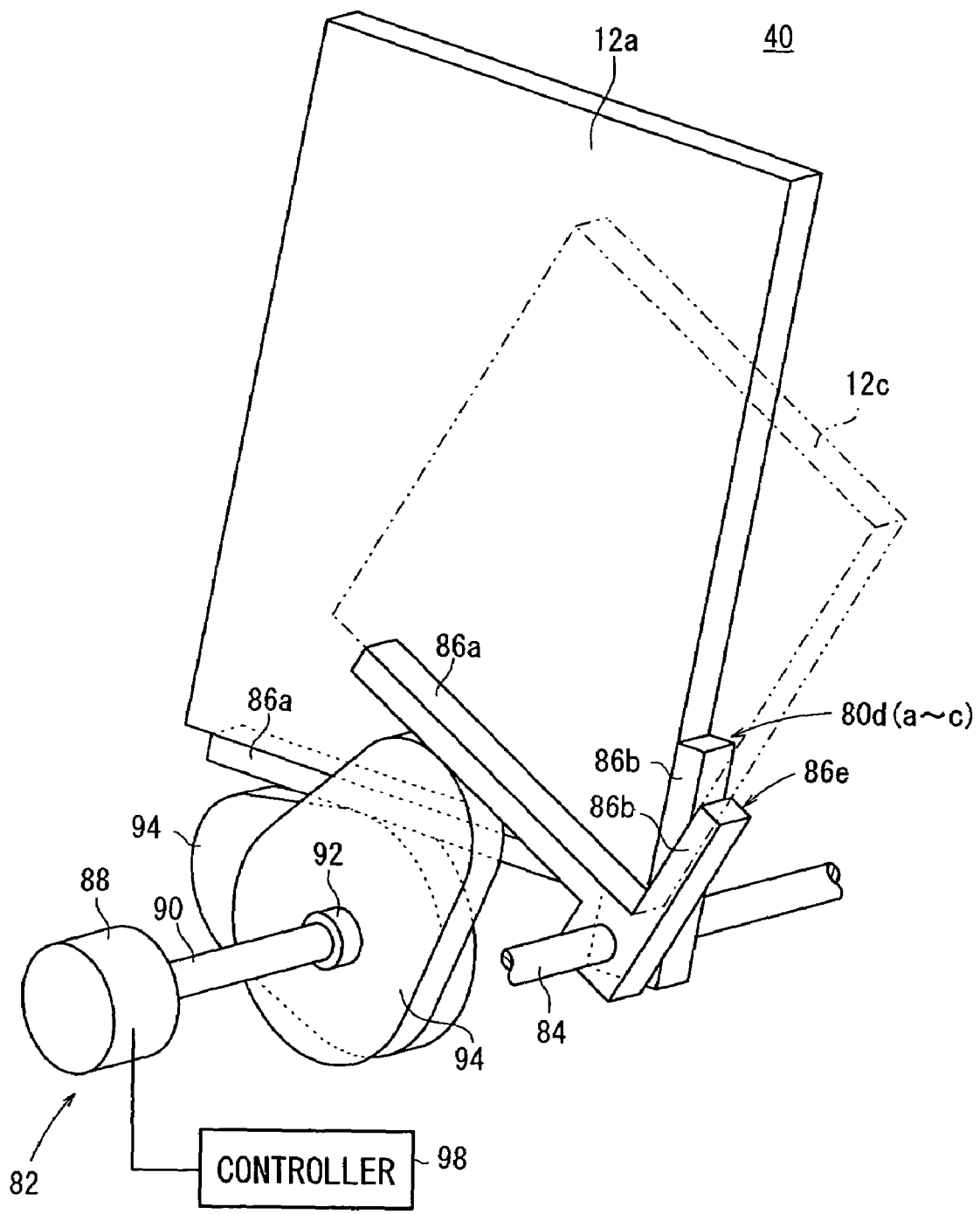
FIG. 5 is a schematic perspective view of the stack units and the tilting mechanism.

As shown in FIGS. 4 and 5, the cassette unloader 40 comprises a plurality of stack units 80a through 80e for holding respective cassettes 12 in an array, and a tilting mechanism 82 for tilting the cassettes 12 held by the respective stack units 80a through 80e at respective different angles depending on the types of those cassettes 12.

The stack units 80a through 80e are angularly movably supported on a support shaft 84 which is slanted downwardly in the direction indicated by the arrow B. Each of the stack units 80a through 80e is substantially L-shaped as viewed in side elevation, and has a holding arm 86a for holding a bottom surface of the cassette 12 thereon and a rear arm 86b for bearing a side of the cassette 12.

The tilting mechanism 82 has a motor (rotary actuator) 88 having an output shaft connected to a rotatable shaft 90. The rotatable shaft 90 is disposed below the stack units 80a through 80e and extends along the array of cassettes 12 held by the respective stack units 80a through 80e. The rotatable shaft 90 supports thereon a plurality of sets of clutches 92 and eccentric cams 94 which are aligned with the respective holding arms 86a of the stack units 80a through 80e.

Each of the clutches 92 selectively transmits and cuts off the rotational power from the rotational shaft 90 to the corresponding eccentric cam 94. Each of the eccentric cams 94 is held in sliding contact with the lower surface of the corresponding holding arm 86a for keeping the holding arm 86a at a desired angle. The clutches 92 are electrically connected through a clutch selector 96 to a controller (control mechanism) 98, which is electrically connected to the motor 88. The controller 98 serves to control operation of the radiation image information reading apparatus 10, and is also electrically connected to detectors including the detector 70 and various actuators.

As shown in FIG. 2, the cassette feeder 42 and the reading unit 44 are isolated from each other by a partition 100 which supports shutter mechanisms 102, 104 for keeping the reading unit 44 shielded against entry of light. The shutter mechanisms 102, 104 are selectively opened for bringing stimulable phosphor panels 14 into and out of the reading unit 44. Nip rollers 106 are disposed between the shutter mechanism 102 and the second processing area 62.

The reading unit 44 has a linear reading feed path 110 extending vertically upwardly and a stimulating light scanner 112 disposed near a substantially central region of the linear reading feed path 110. The stimulating light scanner 112 applies a laser beam L as simulating light which is scanned in a main scanning direction, to a stimulable phosphor panel 14 as it is fed along the reading feed path 110 in an auxiliary scanning direction perpendicular to the main scanning direction. The reading unit 44 also has a light collection guide 114 for collecting stimulated light emitted from the stimulable phosphor panel 14, the light collection guide 114 having an end disposed near a main scanning line formed on the stimulable phosphor panel 14 by the laser beam L. A photoelectric transducer 116 such as a photomultiplier or the like is disposed on the other end of the light collection guide 114 for converting the stimulated light from the stimulable phosphor panel 14 into an electric signal.

A sheet feeder 118 is disposed above the reading feed path 110 for feeding substantially horizontally a stimulable phosphor panel 14 from which recorded radiation image information has been read by the reading unit 44. Specifically, the sheet feeder 118 has a horizontal end disposed above the reading feed path 110 and an opposite horizontal end disposed above the shutter mechanism 104 closer to the cassette unloader 40.

The erasing unit 46 comprises an eraser 120 disposed between the shutter mechanism 104 and the third processing area 64 for erasing residual radiation image information from a stimulable phosphor panel 14 that has been discharged from the reading unit 44. The eraser 120 has a plurality of light sources such as halogen lamps or the light for emitting erasing light. Nip rollers 122, 124 are disposed above and below the eraser 120 for supplying the stimulable phosphor panel 14 from the eraser 120 to the cassette feeder 42.

Operation of the radiation image information reading apparatus 10 according to the first embodiment will be described in detail below.

First, the operator loads a plurality of cassettes 12 each housing a stimulable phosphor panel 14 with radiation image information recorded therein into the cassette loader 38. At this time, the operator can simultaneously load a plurality of cassettes 12 of different sizes into the cassette loader 38.

When the cassettes 12 are loaded, as shown in FIG. 2, the openable and closable lid 50 is turned downwardly to introduce the cassettes 12 on the slanted bottom wall 48 successively one by one into the radiation image information reading apparatus 10. Each of the introduced cassettes 12 is gripped by the nip rollers 68 and supplied to the first processing mechanism 52 that is waiting in the first processing area 60.

At this time, the size information recorded in the identifier 20 on the cassette 12 is read by the detector 70 of the first processing mechanism 52. The first processing mechanism 52 is then guided by the guide members 56, 58 to move from the first processing area 60 to the second processing area 62, thereby feeding the cassette 12 to the second processing area 62.

Then, the unlocking pins are inserted into the respective holes 34a, 34b of the cassette 12 and push the locking leaf springs 30a, 30b out of the holes 34a, 34b. The stimulable phosphor panel 14 housed in the cassette 12 is now unlocked and has its upper end exposed upwardly from the opening 16 of the cassette 12. The nip rollers 106 disposed above the second processing area 62 grip the upper end of the stimulable phosphor panel 14, and supplies the stimulable phosphor panel 14 through the shutter mechanism 102 to the reading unit 44.

After the stimulable phosphor panel 14 is ejected from the cassette 12, the first processing mechanism 52 which is holding the cassette 12 is guided by the guide members 56, 58 to move from the second processing area 62 to the third processing area 64, thereby feeding the cassette 12 to the third processing area 64. The second processing mechanism 54 that is waiting in the third processing area 64 now grips the opposite sides of the cassette 12 with the gripper plates 72a, 72b. Thereafter, the first processing mechanism 52 moves back to the first processing area 60, and processes a next cassette 12 supplied from the cassette loader 38.

The stimulable phosphor panel 14 that has been supplied to the reading unit 44 is fed upwardly in the auxiliary scanning direction along the reading feed path 110, and scanned in the main scanning direction by the stimulating light L emitted from the stimulating light scanner 112. Upon exposure to the simulating light L, the stimulable phosphor panel 14 emits simulated light representing the radiation image information recorded therein. The simulated light emitted from the stimulable phosphor panel 14 is guided by the light collection guide 114 to the photoelectric transducer 116, which converts the stimulated light into an electric signal.

After the recorded radiation image information has been read from the stimulable phosphor panel 14, the stimulable phosphor panel 14 is horizontally fed away from the reading unit 44 by the sheet feeder 118, and then fed downwardly through the shutter mechanism 104 into the erasing unit 46 disposed below the shutter mechanism 104. While the stimulable phosphor panel 14 is being fed downwardly across the eraser 120 by the nip rollers 122, 124, the eraser 120 applies erasing light to the stimulable phosphor panel 14 to erase residual radiation image information from the stimulable phosphor panel 14. After the residual radiation image information has been removed from the stimulable phosphor panel 14, the stimulable phosphor panel 14 is inserted into the cassette 12 waiting in the third processing area 64 through the opening 16.

The cassette 12 with the stimulable phosphor panel 14 housed therein is then fed to the fourth processing area 66 by the second processing mechanism 54. Then, the cassette 12 that is gripped by the gripper plates 72a, 72b is displaced upwardly. The cassette 12 has its upper end gripped by the nip rollers 74 and is discharged into the cassette unloader 40 when the openable and closable lid 76 is opened.

In the cassette unloader 40, the stack units 80a through 80e are slanted downwardly in the direction away from the cassette loader 38, i.e., in the direction indicated by the arrow B. The cassette 12 that is discharged into the cassette unloader 40 is placed on the stack unit 80a that is disposed in the lowermost position. Alternatively, the stack units 80a through 80e may be arrayed horizontally in the direction indicated by the arrow B, and the cassettes 12 which are discharged into the cassette unloader 40 may be moved in the direction indicated by the arrow B by an actuating mechanism, not shown.

A second cassette 12 that is discharged into the cassette unloader 40 is displaced into abutment against the first cassette 12 on the stack unit 80a and placed on the stack unit 80b. Similarly, successively discharged cassettes 12 are placed respectively on the stack units 80c through 80e (see FIG. 4).

The cassettes 12 placed on the stack units 80a through 80e comprise cassettes 12a, 12b, 12c of different types, e.g., of different sizes. Therefore, these cassettes 12a, 12b, 12c are placed in the cassette unloader 40. The cassette 12 of the maximum dimensions is the cassette 12a, the cassette 12 of the minimum size is the cassette 12c, and the cassette 12 of the intermediate size is the cassette 12b.

The cassettes 12a through 12c of different sizes are thus arrayed in the cassette unloader 40. According to the first embodiment, the cassettes 12a through 12c of different sizes are tilted at different angles.

Specifically, as shown in FIGS. 4 and 5, the motor 88 of the tilting mechanism 82 is energized to rotate the rotatable shaft 90 about its own axis. According to the first embodiment, the five eccentric cams 94 are connectably mounted on the rotatable shaft 90 by the respective clutches 92 in alignment with the respective stack units 80a through 80e. The controller 98 controls the clutch selector 96 to selectively engage and disengage the clutches 92 to adjust the positions of the outer circumferential surfaces of the eccentric cams 94 which are held in abutment against the lower surfaces of the holding arms 86a of the stack units 80a through 80e.

Figure 6:
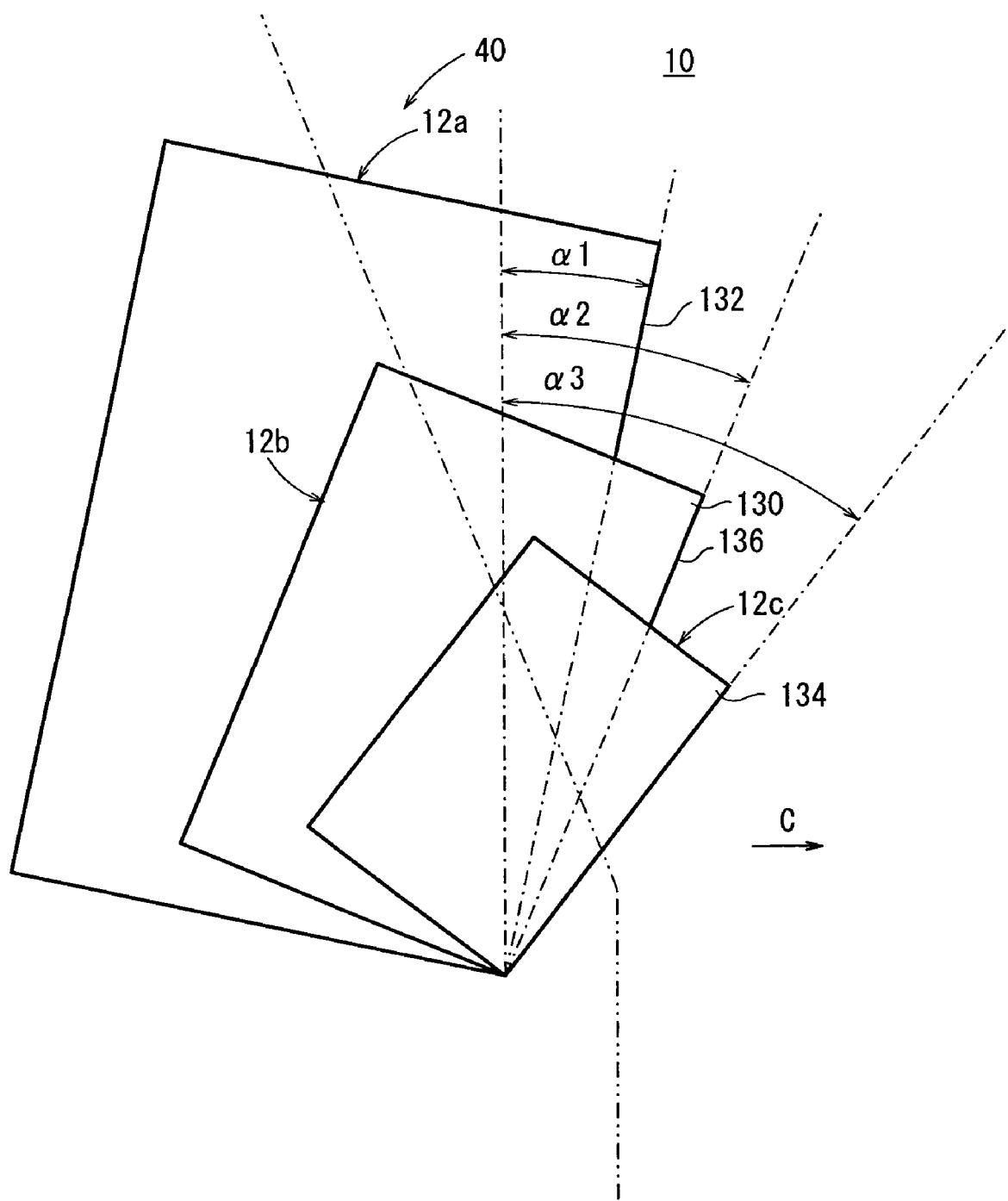
FIG. 6 is a view showing the manner in which cassettes of different sizes are tilted and held.

Specifically, as shown in FIG. 5, in each of the stack units 80a, 80d for placing the cassettes 12a of the large size thereon, the outer circumferential surface of a smaller-diameter portion of the eccentric cam 94 is held in abutment against the lower surface of the holding arm 86a, thereby keeping the cassette 12a obliquely at a relatively small angle of $\alpha 1°$ with respect to the vertical direction (see FIG. 6). In the stack unit 80b for placing the cassette 12b of the intermediate size thereon, the outer circumferential surface of a intermediate-diameter portion of the eccentric cam 94 is held in abutment against the lower surface of the holding arm 86a, thereby keeping the cassette 12b obliquely at an angle of $\alpha 2°$ ($> \alpha 1°$) with respect to the vertical direction (see FIG. 6). In each of the stack units 80c, 80e for placing the cassettes 12c of the small size thereon, the outer circumferential surface of a larger-diameter portion of the eccentric cam 94 is held in abutment against the lower surface of the holding arm 86a, thereby keeping the cassette 12c obliquely at a relatively large angle of $\alpha 3°$ ($> \alpha 2°$) with respect to the vertical direction (see FIG. 6).

Therefore, as shown in FIG. 6, a corner 130 of the cassette 12b of the intermediate size projects outwardly in the direction indicated by the arrow C beyond an end 132 of the cassette 12a of the large size, and a corner 134 of the cassette 12c of the small size projects outwardly in the direction indicated by the arrow C beyond ends 132, 136 of the cassettes 12a, 12b. Therefore, the operator can easily and reliably remove the cassette 12b of the intermediate size which is positioned adjacent to the cassette 12a of the large size from the cassette unloader 40 by gripping the outwardly projecting the corner 130.

The operator can also easily and reliably remove the cassette 12c of the small size which is positioned between the cassette 12b of the intermediate size and the cassette 12a of the large size from the cassette unloader 40 by gripping the outwardly projecting the corner 134. Accordingly, the cassettes 12 of the different sizes can be handled with increased efficiency.

The identification information such as the size of the cassette 12 and the sensitivity of the stimulable phosphor panel 14 housed therein is recorded in the identifiers 20, 22 each comprising a bar code, an IC chip, or an RFID chip on the cassette 12. By reading the identification information recorded in the identifier 20 and/or the identifier 22, the controller 98 can hold the cassettes 12a through 12c obliquely at respective desired angles highly reliably based on the read identification information.

In the first embodiment, the cassettes 12a through 12c having different sizes are held obliquely at respective different angles. However, even if stimulable phosphor panels 14 of different sensitivities are housed in respective cassettes 12 of the same size, the cassettes 12 may be held obliquely at respective desired angles for allowing the operator to remove easily and reliably those cassettes 12 which house the stimulable phosphor panels 14 of a desired sensitivity from the cassette unloader 40.

In the first embodiment, furthermore, the cassette unloader 40 has the stack units 80a through 80e and the tilting mechanism 82. However, the cassette loader 38 may have the stack units 80a through 80e and the tilting mechanism 82 for allowing the operator to load the cassette loader 38 easily and efficiently with cassettes 12a through 12c of different sizes.

The identification information of cassettes 12 may be stored and managed by a control mechanism, a network, or the like outside of the radiation image information reading apparatus 10, the angles at which the cassettes 12a through 12c are tilted in the cassette unloader 40 and/or the cassette loader 38 may be controlled based on the identification information thus stored and managed.

The radiation image information reading apparatus 10, the cassette unloader 40, or the controller 98 may have switches such as push-button switches, and the angles at which cassettes 12 are tilted may be preset by operating those switches. Alternatively, the information of cassettes 12 may be entered or read, and the angles at which cassettes 12 are tilted may be preset based on the information thus entered or read. In this manner, only a cassette 12 to be used next may be selected and tilted based on the preset angles to allow the operator to remove the cassette 12 with ease.

Figure 7:
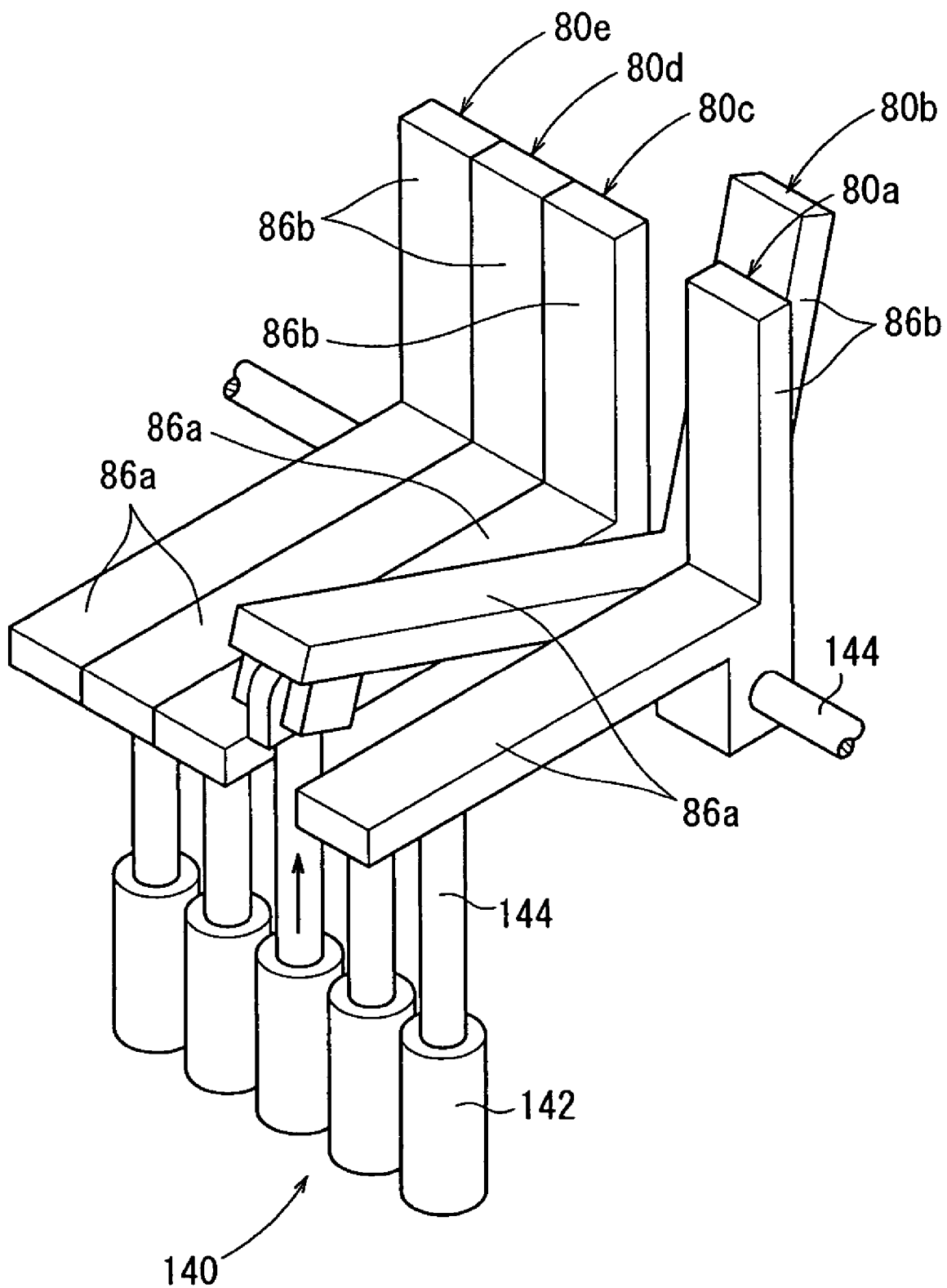
FIG. 7 is a schematic perspective view of stack units and a tilting mechanism of a cassette processing apparatus according to a second embodiment of the present invention.
Figure 8:
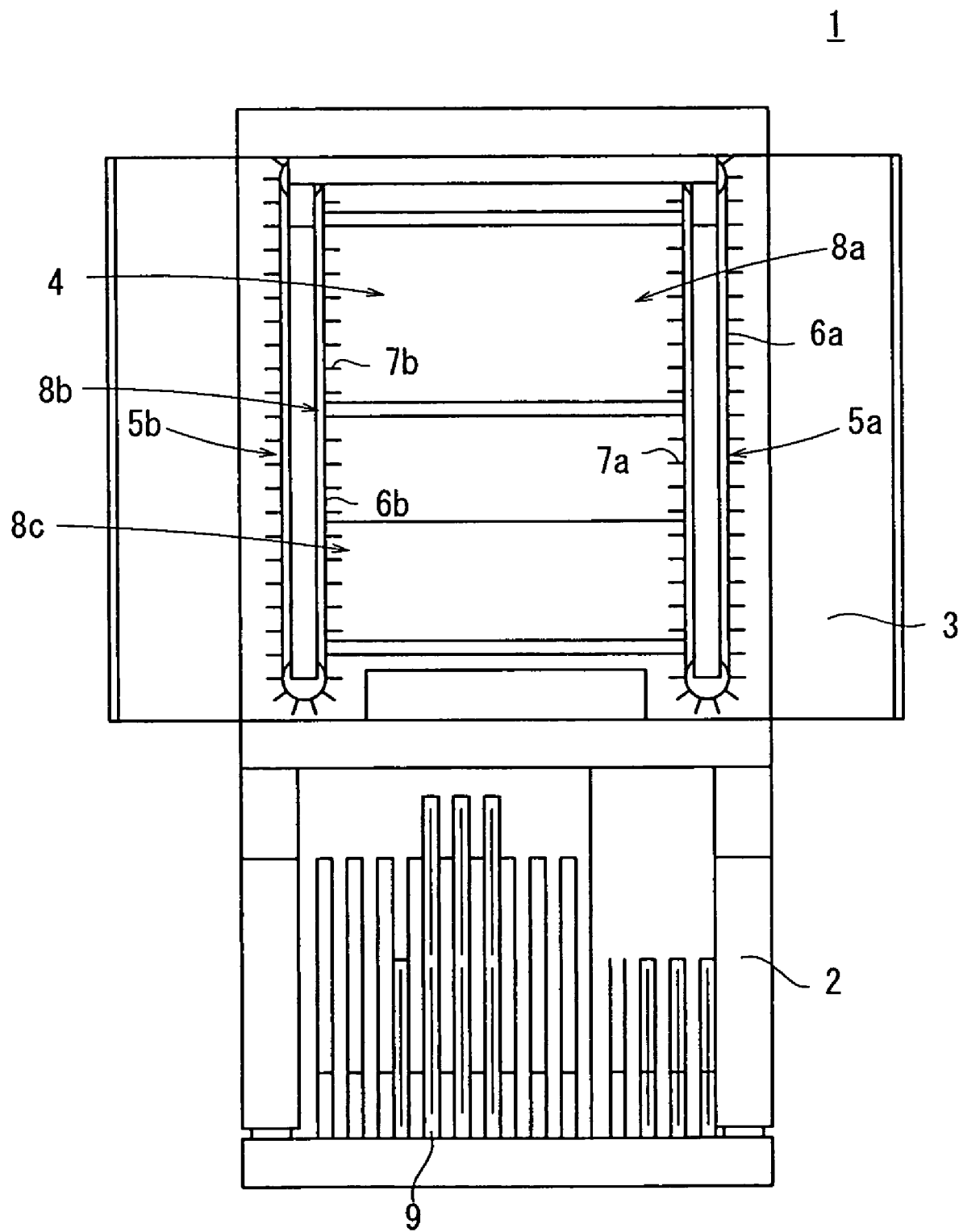
FIG. 8 is a front elevational view of a conventional automatic storage phosphor cassette loader.

FIG. 7 shows in perspective stack units 80a through 80e and a tilting mechanism 140 of a cassette processing apparatus according to a second embodiment of the present invention. Those parts of the stack units 80a through 80e which are identical to those of the radiation image information reading apparatus 10 according to the first embodiment are denoted by identical reference characters, and will not be described in detail below.

The tilting mechanism 140 comprises a plurality of cylinders 142 disposed respectively below the holding arms 86a of the stack units 80a through 80e. The cylinders 142 have respective movable rods 144 held in abutment against or connected to the lower surfaces of the respective holding arms 86*a*. When one of the cylinders 142 is selected and actuated, the stack unit 80*b*, for example, can be tilted an angle greater than the stack unit 80*a*, for example. Therefore, the cassette processing apparatus according to the second embodiment offers the same advantages as those of the cassette processing apparatus according to the first embodiment.

Although certain preferred embodiments of the present invention have been shown and described in detail, it should be understood that various changes and modifications may be made therein without departing from the scope of the appended claims.

What is claimed is:

1. A cassette processing apparatus for use with at least one of a cassette loader for loading a cassette housing a recording medium capable of storing radiation image information and a cassette unloader for unloading the cassette, comprising:
    a plurality of stack units for holding respective cassettes in an array; and
    a tilting mechanism for tilting said cassettes held by the respective stack units at respective different angles depending on the types of said cassettes.

2. A cassette processing apparatus according to claim 1, further comprising:
    a detecting mechanism for detecting the types of said cassettes; and
    a control mechanism for controlling said tilting mechanism based on the types of said cassettes detected by said detecting mechanism.

3. A cassette processing apparatus according to claim 2, wherein said detecting mechanism comprises:
    an identifier mounted on each of said cassettes and recording the type of the cassette therein; and
    a detector mounted in the cassette processing apparatus, for reading said identifier.

4. A cassette processing apparatus according to claim 1, wherein each of the types of said cassettes includes at least a dimension of said cassette or the sensitivity of said recording medium.

5. A cassette processing apparatus according to claim 1, wherein each of said stack units is L-shaped as viewed in side elevation, and is angularly movably mounted on a support shaft, each of said stack units comprising:
    a holding arm for holding a bottom surface of the cassette thereon; and
    a rear arm for bearing a side of the cassette.

6. A cassette processing apparatus according to claim 5, wherein said tilting mechanism comprises:
    a rotatable shaft connected to a rotary actuator; and
    a plurality of eccentric cams connectably mounted on said rotatable shaft by respective clutches, and each held in contact with a lower surface of said holding arm for keeping said holding arm at a predetermined angular position.

7. A cassette processing apparatus according to claim 5, wherein said tilting mechanism comprises a plurality of cylinders each held in contact with the lower surface of said holding arm.

* * * * *